3,557,145
STABILIZING THIIRANE COMPOUNDS
Russell T. McFadden, Jones Creek, Tex., assignor to The
 Dow Chemical Company, Midland, Mich., a corpora-
 tion of Delaware
No Drawing. Filed May 13, 1968, Ser. No. 728,748
Int. Cl. C07d 59/00
U.S. Cl. 260—327                                        21 Claims

ABSTRACT OF THE DISCLOSURE

Thiiranes are stabilized against polymerization by blending with from .01 to about 5 percent by weight of compounds having the structure $$A-\overset{S}{\underset{\|}{C}}-N\overset{H}{\underset{R}{\diagdown}}$$

where R is H, an alkyl group of 1–8 C atoms or an alkenyl group of 3–8 C atoms, and A is an alkyl group of 1–8 C atoms, an alkoxy group of 1–8 C atoms,

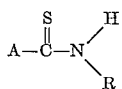

where one of $R_2$, $R_3$ can be H and one or both can be alkyl of 1–8 C atoms, phenyl or halophenyl groups, or

where $R_4$ and $R_5$ can each be H, an alkyl group of 1–8 C atoms phenyl or halophenyl groups and $R_6$ is an alkylene group of 1–8 C atoms.

---

This invention relates to a mixture of a thiirane and a stabilizing agent to reduce the degree of or prevent polymerization of the thiirane and to a method of stabilizing the thiirane by blending with certain thioamides and more particularly pertains to mixtures of (1) at least one vicinal thiirane and (2) at least one compound of the structure $$A-\overset{S}{\underset{\|}{C}}-N\overset{H}{\underset{R}{\diagdown}}$$

where R represents H, an alkyl group of 1 to 8 C atoms, or an alkenyl group of 3 to 8 C atoms, and A represents (1) an alkyl group of 1–8 C atoms, an alkoxy group of 1–8 C atoms, a phenyl group or a halophenyl group, (2)

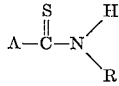

where not more than one of $R_2$ or $R_3$ can be H and the other or both can be an alkyl group of 1–8 C atoms, a phenyl or a halophenyl group, or (3)

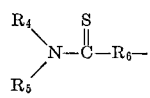

where $R_4$ and $R_5$ can each be H, alkyl of 1–8 C atoms, phenyl or halophenyl groups and $R_6$ is an alkylene group of from 2 to 8 C atoms, and to a method of stabilizing the thiiranes by dissolving therein a small but effective amount of at least one compound of the structure defined above.

Thiiranes, or alkylene sulfides or episulfides of the structure $$Y-\underset{\diagdown\underset{S}{\diagup}}{CHCH}-Y'$$

wherein Y and Y' can each represent —H, an aliphatic hydrocarbon group, an aromatic hydrocarbon group or a cycloaliphatic group and halogen, —SH, —OH, ester, —CN, polyoxyalkylene and polythioalkylene groups and substituted derivatives thereof, have a great propensity toward spontaneous polymerization when stored, either as individual components or as mixtures, even when the thiiranes are highly purified and are substantially free of water.

Previous means for stabilizing thiiranes are based on the addition of $H_2S$, alkyl or aryl mercaptans or a mixture of one of these —SH containing compounds with a linear thioether. The stabilizers of the prior art are satisfactory for prevening polymerization of the thiiranes at low temperatures to a storage period of about a week or for short periods of storage at vacuum distillation temperature. However, they are difficult to separate from the thiirane because of their volatiliy. The $H_2S$ or mercaptans can be removed by chemical means, but great care must be exercised to avoid polymerization of the thiirane. In addition, $H_2S$ and mercaptans will react slowly with the thiiranes so that on prolonged storage the stabilizing compounds are converted to derivatives which either no longer have polymerization inhibiting activity or have this activity in a very greatly reduced degree.

One of the advantages of this invention is that the compounds of the structure $$A-\overset{S}{\underset{\|}{C}}-\overset{H}{N}-R$$

where A and R have the designation given above, will stabilize thiiranes against polymerization during extended periods of storage. Another advantage is that the storage temperature can be as high as about 60° C. A further advantage is that the stabilizers are effective even in bright daylight in glass containers. A still further advantage is that the thiirane can be separated from the stabilizer by simple distillation because of their relatively high boiling points as compared with the boiling points of the thiiranes. Yet another advantage is that the stabilizers are effective at relatively low concentrations.

The above advantages are obtained from a mixture comprising .01 percent to about 5 percent by weight, preferably from about 0.1 to about .5 percent based on the thiirane of at least one compound having the structure

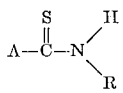

where A and R have the defined designation. The thiirane can be any one or a mixture of compounds of the structure

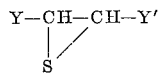

as defined. The mixture can contain one or more inert diluents, which include but are not limited to liquid alkanes, aromatic hydrocarbons, liquid mono- and polyhydric alkanols, liquid alkyl and aromatic ethers, esters, alkyl sulfides, alkyl disulfides, ketones and halogenated derivatives of the above diluents and alkyl substituted aromatic hydrocarbons. Representative diluents are hexane, saturated liquid petroleum distillates, benzene, toluene, xylene, methanol, propanols, butanols, pentanols, hexanols, heptanols, octanols, diethyl ether, dipropyl ethers, dibutyl ethers, methyl butyl ether, methylene chloride or bromide, dichloro or dibromo ethane, chloro and bromobutanes, perchloroethane, chlorobenzene, chlorotoluene, chloroxylene, propyl sulfide, ethyl acetate, and acetone. The method of obtaining the advantages of this invention comprises commingling or blending of the defined essential ingredients. Any blending order can be used. Either the thiirane, stabilizer or both or mixtures of thiiranes with mixtures of stabilizers can be commingled with or without inert diluents, which if used, can be added before, during or after blending.

The specific thiiranes that can be protected against polymerization by commingling with the stabilizers of this invention include thiirane (ethylene sulfide), 1,2-propylene sulfide, 1,2-butylene sulfide, 2,3-butylene sulfide, 1,2-pentylene sulfide, 2,3-pentylene sulfide, 1,2- 2,3- and 3,4-hexylene sulfide, 1,2-octylene sulfide cyclohexene sulfide, 1-phenyl ethylene sulfide, 1-phenyl-2,3-propylene sulfide, 2-phenyl-1,2-propylene sulfide, 1-(2-methoxyphenyl)-2-3 - propylene sulfide, 1-(2-methylphenyl)-1,2-ethylene sulfide, 1-(2-methylphenyl)-2,3 - propylene sulfide, 1-(2,3-dimethylphenyl)2,3-propylene sulfide, 1-(2,4-dimethylphenyl)-2,3-propylene sulfide, 1-chloro-2,3-propylene sulfide, 1-bromo-2,3-propylene sulfide, 1-hydroxy-2,3 - propylene sulfide, 1 - methoxyl-2,3-propylene sulfide, 1-mercapto-2,3-propylene sulfide, allyl thioglycidyl ether and mixtures of any of these alkylene sulfides.

The thiiranes vary considerably in their inherent reactivity. The most difficult to maintain in the monomeric state is thiirane

The next higher homologue, 1,2-propylene sulfide

can, if sufficiently purified, be kept in the monomeric state at temperatures close to 0° C. for an extended period of time. Cyclohexene sulfide can be stored at room temperature for about a week, but it will form a polymer slowly on standing and at elevated temperature it will polymerize fairly rapidly. In mixtures, the most reactive thiirane appears to be no more stable than it is alone, so that when it starts polymerizing it will tend to accelerate the homo or copolymerization of the more inherently stable thiirane with which it is commingled or blended.

The compounds which act as polymerization inhibitors or stabilizers for monomeric thiiranes all have a thioamide or substituted thioamide group. Included among these compounds are thioacetamide, thiopropionamide, thiobutyramide, thiocapramide, dithiooxamide, dithio- succinamide, dithioadipamide, N-phenyl thiourea, N-allyl-N,N'-disopropyl thiourea, thiobenzamide, thiophenylacetamide, methyl thiourethane, (N-allyl)butyl thiourethane, (N-allyl)ethyl thiourethane and actylthiourethane, methyl, ethyl, propyl, butyl, pentyl, hexyl, heptyl and octyl thioncarbamates.

If the stabilizers are added as solutions in an inert solvent, it is preferred, but not necessary, that the solvent employed is also a solvent for the thiirane. In any event, the stabilizer must be soluble in the thiirane compound.

The examples which follow are intended to illustrate but not to limit the invention. In all instances parts are given by weight unless otherwise specifically indicated.

EXAMPLE 1

A mixture of 5 weight parts of thiirane

and .05 weight parts of thioacetamide was stored in glass containers outdoors, exposed to summer weather in Texas at daytime temperatures of about 95–100° F. The sample was checked periodically for signs of polymer formation. After one week there appeared to be only an extremely slight amount of polymer formation at the liquid-glass interface. The remainder of the thiirane was liquid and completely clear. The thiirane is easily separated from the thioacetamide by distillation.

For comparative purposes a sample of the thiirane containing no inhibitor and samples each containing 1 percent by weight, based on the thiirane, of mercaptoethanol, allyl mercaptan, thioglycolic acid and t-octylmercaptan were subjected to the same storage conditions as described above. Within 48 hours all these comparative mixtures were turbid and after one week all the comparative samples developed copious amounts of precipitate.

EXAMPLE 2

A mixture of 0.5 weight percent thioacetamide, based on thiirane, was prepared and stored in a steel container under outdoor summer conditions in Texas. An uninhibited control was stored under substantially identical conditions at the same time. In two weeks the uninhibited thiirane polymerized to a solid white mass. The inhibited monomeric thiirane was clear after two months storage.

EXAMPLE 3

A series of samples using various stabilizers or polymerization inhibitors was prepared by dissolving the stabilizer in thiirane. The mixtures were stored in glass containers under substantially identical outdoor summer conditions in Texas. A control sample having no stabilizer was included in the series. In the table below are listed the stabilizers and concentrations used in the tests.

| Stabilizer | Concentration weight percent |
|---|---|
| N-phenyl thiourea | 0.5 |
| Thioacetamide | 0.1 |
| Dithioadipamide ($H_2N-\overset{S}{\overset{\|}{C}}CH_2)_4\overset{S}{\overset{\|}{C}}-NH_2$) | 0.5 |
| N-allyl-N',N'-diisopropylthiourea | 0.5 |

After 21 days all the samples containing the stabilizers listed in the table were liquid and clear. The control containing no stabilizer was polymerized.

EXAMPLE 4

A series of different thiirane compounds was prepared containing various amounts of thioacetamide as polymerization inhibitor. These samples were stored in an oven at 130° F., and the viscosities were measured after four weeks. The sample compositions and viscosities are shown in the following table.

| | Weight of thiirane, gm. | Weight of thioacetamide, gm. | Viscosity after storage at 130° F. for— | |
|---|---|---|---|---|
| | | | 0 days | 28 days |
| Sample Number: | | | | |
| 1. A | Thioepichlorohydrin, 50 | 1.0 | [1] 0.7 | [1] 0.8 |
| B | do | 0.5 | 0.7 | 1.0 |
| C | Thioepichlorohydrin, 10 | 0.0 | 0.6 | 1.3 |
| 2. A | 1,2-propylene sulfide, 50 | 1.0 | 0.5 | 0.5 |
| B | do | 0.5 | 0.4 | 0.6 |
| C | 1,2-propylene sulfide, 10.0 | 0.0 | 0.4 | 1.1 |
| 3. A | 1,2-butylene sulfide, 50 | 1.0 | 0.5 | 0.5 |
| B | do | 0.5 | 0.4 | 0.6 |
| C | 1,2-butylene sulfide, 10.0 | 0.0 | 0.4 | 0.9 |
| 4. A | Allyl thioglycidyl ether, 50 | 1.0 | 0.6 | 0.6 |
| B | do | 0.5 | 0.6 | 0.6 |
| C | Allyl thioglycidyl ether 10.0 | 0.0 | 0.5 | 0.9 |

[1] Viscosity was measured by the time in seconds required for a bubble to traverse the specified distance in an inverted Gardner-Holdt viscosity tube, at 25° C.

EXAMPLE 5

In this example ethylthioncarbamate ($C_2H_5O$—$CSNH_2$) was employed as a stablizer for ethylene sulfide and propylene sulfide. The ethylthioncarbamate was added to the 50 g. of the thiirane in glass bottles to provide defferent levels of stabilizer concentrations and then subjected to 55° C. storage for accelerated testing. The data obtained are tabulated in the following table.

| Thiirane | Grams of $C_2H_5OCSNH_2$ | Observations | | |
|---|---|---|---|---|
| | | 1 week | 2 weeks | 3 weeks |
| Ethylene sulfide | 1.0 | No precipitation | No precipitation | Very light precipitation. |
| | 0.25 | do | do | Do. |
| | None | Light precipitation | Medium precipitation | Heavy precipitation. |
| Propylene sulfide | 0.5 | No thickening | No thickening | No thickening. |
| | 0.1 | do | do | Slight thickening. |
| | None | do | do | Definite thickening. |

It is apparent that the thioncarbamate protects the more stable thiirane from polymerizing at relatively high temperatures and is capable of preventing the most active thiirane from polymerizing for more than two weeks at high storage temperature.

The unusual ability of the compounds having the structure $$A-\overset{S}{\underset{\|}{C}}-\overset{H}{\underset{|}{N}}-R$$

as ddefined, for stabilizing thiiranes has been exemplified by showing their superior effectiveness in inhibiting the polymerization of ethylene sulfides, the most reactive of the thiirane series as well as other thiiranes having up to 6 C atoms, including a halogen substituted and an alkoxy substituted thiirane. It is to be understood that all the remaining thiiranes defined by the generic formula

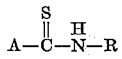

are also stabilized by the compounds of the formula $$A-\overset{S}{\underset{\|}{C}}-\overset{H}{\underset{|}{N}}-R$$

I claim:

1. A composition consisting essentially of (1) a thiirane of the formula

wherein Y is H or an alkyl group of 1 to 2 C atoms, and $Y^1$ is H, an alkyl radical having 1–6 C atoms, inclusive,

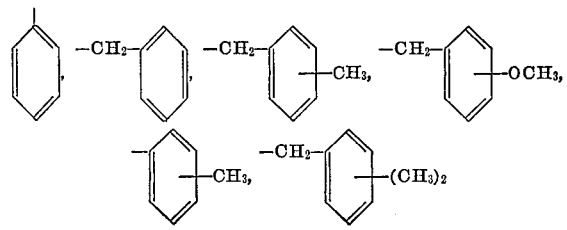

—$CH_2CL$, —$CH_2Br$, —$CH_2OH$, —$CH_2OCH_3$, —$CH_2SH$, or —$CH_2SCH_2CH=CH_2$, or Y and $Y^1$ together form —$(CH_2)_4$— of a cyclohexyl group, and (2) from 0.01 to about 5 percent by weight based on said thiirane of a compound having the structure

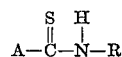

wherein R is (a) H, an alkyl group of from 1 to 8 carbon atoms or an alkenyl group of 3–8 C atoms and A is an alkyl group of 1–8 C atoms, an alkoxy group of 1–8 C atoms, a phenyl or a halophenyl group, (b)

where one of $R_2$, $R_3$ can be H and one or both can be an alkyl group of 1–8 atoms, a phenyl or halophenyl group or (c)

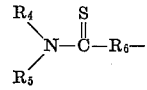

where $R_4$ and $R_5$ can each be H, an alkyl group of 1–8 C atoms, a phenyl or a halophenyl group and $R_6$ is an alkylene group of 2–8 C atoms.

2. The composition of claim 1 in which the thiirane is

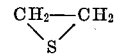

3. The composition of claim 1 in which the thiirane is

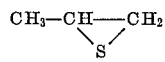

4. The composition of claim 1 in which the thiirane is

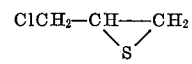

5. The composition of claim 1 in which the compound

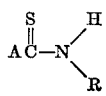

is an amide of a thioacid having from 2 to 8 carbon atoms.

6. The composition of claim 1 in which the compound

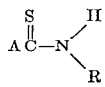

is a mono N-substituted thiourea in which the substituent is a hydrocarbon group of from 1 to about 6 carbon atoms.

7. The composition of claim 1 in which the compound

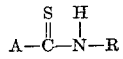

is a substituted thiourea in which each nitrogen is monosubstituted with an aliphatic hydrocarbon group of from 1 to 8 carbon atoms.

8. The composition of claim 1 in which the thiirane is

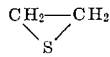

and the stabilizer is thioacetamide.

9. The composition of claim 8 in which the stabilizer is N-phenyl thiourea.

10. The composition of claim 8 in which the stabilizer is N-allyl-N-N'-diisopropyl thiourea.

11. The composition of claim 8 in which the stabilizer is dithioadipamide.

12. The composition of claim 8 in which the stabilizer is ethylthioncarbamate.

13. The composition of claim 1 in which the thiirane is allyl thioglycidyl ether.

14. The composition of claim 1 in which the thiirane is

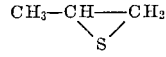

and the stabilizer is thioacetamide.

15. The composition of claim 14 in which the stabilizer is N-phenyl thiourea.

16. The composition of claim 14 in which the stabilizer is N-allyl, N-N'-diisopropyl thiourea.

17. The composition of claim 14 in which the stabilizer is dithioadipamide.

18. A method of inhibiting the polymerization of thiiranes having the structure

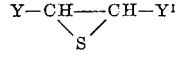

wherein Y is H or an alkyl group of 1 to 2 C atoms, and $Y^1$ is H, an alkyl radical having 1–6 C atoms, inclusive,

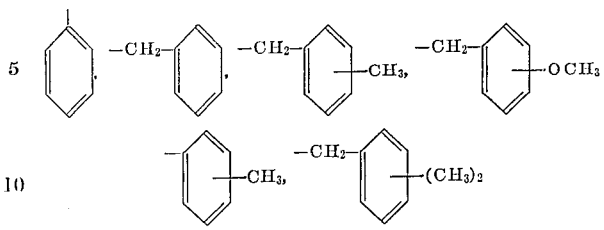

—$CH_2Cl$, —$CH_2Br$, —$CH_2OH$, —$CH_2OCH_3$, —$CH_2SH$, or —$CH_2SCH_2CH=CH_2$, or Y and $Y^1$ together form —$(CH_2)_4$— of a cyclohexyl group, comprising commingling said thiirane with from 0.01 to about 5 percent by weight, based on said thiirane, of a soluble compound of the structure

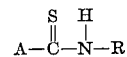

wherein R is (a) H, an alkyl group of 1–8 C atoms, or an alkenyl group of 3–8 C atoms and A is an alkyl group of 1–8 C atoms, an alkoxy group of 1–8 C atoms, a phenyl or a halophenyl group, (b)

where one of $R^2$ and $R_3$ can be H and one or both can be an alkyl group of 1–8 C atoms, a phenyl or a halophenyl group and $R_6$ is an alkylene group of 2–8 C atoms.

19. The method of claim 18 in which the thiirane is

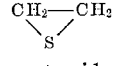

and the stabilizer is thioacetamide.

20. The method of claim 18 in which the thiirane is

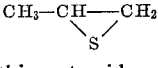

and the stabilizer is thioacetamide.

21. The method of claim 18 in which the stabilizer is N-phenyl thiourea.

References Cited
UNITED STATES PATENTS 3,317,919   5/1967   Sander _____ 260—79

HENRY R. JILES, Primary Examiner

C. M. SHURKO, Assistant Examiner